(12) United States Patent
Kim et al.

(10) Patent No.: US 7,289,833 B2
(45) Date of Patent: Oct. 30, 2007

(54) APPARATUS AND METHOD FOR CONTROLLING OPENING AND CLOSING OF SUB-BODY IN AN AUTOMATICALLY AND MANUALLY FOLDABLE MOBILE COMMUNICATION TERMINAL

(75) Inventors: Sang-Soon Kim, Suwon-shi (KR); Jae-Young Jang, Suwon-shi (KR); Sang-Man Seong, Suwon-shi (KR); Sang-Joon Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 370 days.

(21) Appl. No.: 10/023,638

(22) Filed: Dec. 17, 2001

(65) Prior Publication Data

US 2002/0114448 A1 Aug. 22, 2002

(30) Foreign Application Priority Data

Feb. 16, 2001 (KR) .................................. 2001-7886

(51) Int. Cl.
*H04M 1/00* (2006.01)

(52) U.S. Cl. .............................. 455/575.3; 455/550.1; 455/575.1; 455/90.3; 455/347

(58) Field of Classification Search ............. 455/575.3, 455/575.1, 550.1, 90.1, 90.3, 556.1–556.2, 455/127.1, 128, 347; 379/433.01, 433.06, 379/433.11, 433.12, 433.13, 428.01; 318/434, 318/447
See application file for complete search history.

(56) References Cited

U.S. PATENT DOCUMENTS

| 4,857,813 | A | * | 8/1989 | Matsumoto et al. ........... 318/54 |
| 5,151,946 | A | * | 9/1992 | Martensson ............... 455/575.4 |
| 5,453,669 | A | * | 9/1995 | Nishibe et al. ............. 318/434 |
| 5,521,473 | A | * | 5/1996 | Mizuno et al. ............. 318/285 |

(Continued)

FOREIGN PATENT DOCUMENTS

EP 0 414 365 7/1990

(Continued)

OTHER PUBLICATIONS

European Search Report dated Dec. 2, 2003 issued in a counterpart application, namely, Appln. No. 02003572.1.

*Primary Examiner*—Charles N. Appiah
*Assistant Examiner*—Willie J. Daniel, Jr.
(74) *Attorney, Agent, or Firm*—The Farrell Law Firm

(57) ABSTRACT

Disclosed are an apparatus and a method for controlling a correct position of opening and closing a sub-body (folder) in an automatic foldable mobile communication terminal. A sensor means is arranged in one end of a main-body and the sub-body, for detecting a fully open status or a fully closed status of the sub-body. A sub-body opening and closing drive unit opens or closes the sub-body by activating a drive motor. A current sensing unit is coupled to a control unit for sensing an amount of motor drive current applied to the sub-body drive motor. The control unit measures the motor drive current from the current sensing unit upon an enabling of an automatic opening or closing operation of the sub-body, and then discontinues to drive the sub-body drive motor when the measured amount of the motor drive current is larger than a predetermined current threshold and the sensor means senses either one of a fully open status or a fully closed status.

4 Claims, 7 Drawing Sheets

U.S. PATENT DOCUMENTS

| | | | |
|---|---|---|---|
| 5,649,309 A * | 7/1997 | Wilcox et al. | 455/575.3 |
| 5,723,959 A * | 3/1998 | Iwata et al. | 318/447 |
| 6,094,565 A | 7/2000 | Alberth et al. | |
| 6,163,682 A * | 12/2000 | Lee | 455/575.7 |
| 6,373,006 B1 * | 4/2002 | Toki | 200/61.7 |
| 6,374,089 B1 * | 4/2002 | Till | 455/90.1 |
| 6,438,392 B1 * | 8/2002 | Toba | 455/567 |
| 6,484,016 B1 * | 11/2002 | Cheon | 455/90.1 |
| 6,600,282 B2 * | 7/2003 | Ko | 318/445 |
| 6,621,066 B2 * | 9/2003 | Kim | 250/221 |
| 6,628,974 B1 * | 9/2003 | Lim | 379/433.11 |
| 2003/0003962 A1 * | 1/2003 | Vooi-Kia et al. | 455/566 |

FOREIGN PATENT DOCUMENTS

| | | |
|---|---|---|
| JP | 2001-036325 | 2/2001 |
| WO | WO 00/11851 | 3/2000 |
| WO | WO 00/51317 | 8/2000 |

\* cited by examiner

APPARATUS AND METHOD FOR CONTROLLING OPENING AND CLOSING OF SUB-BODY IN AN AUTOMATICALLY AND MANUALLY FOLDABLE MOBILE COMMUNICATION TERMINAL

CLAIM OF PRIORITY

This application makes reference to, incorporates the same herein, and claims all benefits accruing under 35 U.S.C. §119 from an application entitled "A Method for Controlling Opening and Closing of Sub-Body in Automatically and Manually Foldable Portable Mobile Communication Terminal" earlier filed in the Korean Industrial Property Office on Feb. 16, 2001 and thereby duly assigned Serial No. 07886/2001 by the Office.

BACKGROUND OF THE INVENTION

1. Field of the Invention

The present invention relates generally to a mobile telephone terminal, and in particular, to an apparatus and a method for controlling opening and closing of a sub-body in an automatically and manually foldable mobile communication terminal.

2. Description of the Related Art

A mobile radio terminal is a portable mobile station that provides radio communication services to its subscriber while wirelessly communicating with a base station. Mobile telephone terminals are generally classified into two types of terminals, i.e., a bar-type terminal and a foldable terminal. The bar-type terminal with its keypad exposed to the outside, has recently trended toward less popular use due to its exposed keypad providing no protection against any careless use. On the other hand, the foldable terminal provided with a main body and a sub-body, which is foldably coupled to the main body so that it is designed to fully cover a keypad disposed on the main body, is winning much more popularity for its compact size and good protection for its keypad.

Conventionally, the foldable terminals are classified into a flip-type terminal, a flip-up-type terminal and a folder-type terminal. The flip-type terminal has a flip cover that serves as a sub-body for protecting the keypad mounted on a main body and concentrating a user's voice into a microphone mounted on the main body. The flip-up-type terminal is analogous to that of the flip-type in appearance, but further featured by a flip cover capable of opening up toward the upper side of the main body. The folder-type terminal has at least one display assembly consisting of one or more Liquid Crystal Display (LCD) modules mounted on either an inside or an outside, or both, of the sub-body other than a main body of the foldable terminal.

In recent years, customer need for a more convenient portable terminal has given rise to a so-called automatic foldable terminal designed to open and close the sub-body (usually referred to as a "folder") automatically as well as manually, by means of driving a folder motor disposed inside the terminal. Therefore, it is noted that such an automatic foldable terminal requires a more efficient and precise control for driving the motor opening or closing the sub-body.

SUMMARY OF THE INVENTION

It is, therefore, an object of the present invention to provide an apparatus and a method for more efficiently and precisely controlling the position of opening and closing a sub-body (folder) of an automatic foldable mobile communication terminal.

To achieve the above and other objects of the present invention, there is provided an apparatus for controlling opening and closing of a folder in a foldable mobile communication terminal having a main body and a sub-body foldably mounted on the main body. The apparatus comprises: a sensor means arranged in the vicinity of one end of the main-body and the sub-body, for detecting a fully open status or a fully closed status of the sub-body on the main-body; a sub-body opening and closing drive unit for automatically opening or closing the sub-body by means of activating a sub-body drive motor rotatably coupled with the one end of the sub-body; and a current sensing unit coupled to the control unit for sensing the amount of motor drive current applied to the sub-body drive motor and providing the sensed amount of motor drive current to a control unit. The control unit takes a measurement of the amount of the motor drive current output from the current sensing unit upon enabling of an automatic opening or closing operation of the sub-body in the sub-body opening and closing drive unit, and then discontinues to drive the sub-body drive motor when the measured amount of the motor drive current is larger than a predetermined current threshold value and the sensor means senses either one of a fully open status or a fully closed status of the sub-body.

Preferably, the apparatus includes a first magnet disposed in a hinge, which is provided with the sub-body opening and closing drive unit, rotatably connected to one end of the sub-body and the main-body, a second magnet mounted inwardly on an inner surface of the sub-body spaced apart from the hinge, an opening sensor disposed in the vicinity of the hinge, on one end of an lower surface of a printed circuit board inside the main-body for providing the control unit with a first sensing signal when the first magnet is placed in close proximity to the opening sensor, and a closing sensor disposed in a position opposing to the second magnet spaced apart from the hinge on the printed circuit board. The closing sensor provides the control unit with a second sensing signal when the second magnet is placed in close proximity to the closing sensor.

According to another aspect of the present invention, there is provided a method for controlling automatic opening and closing of a folder in a foldable mobile communication terminal having a main body, a sub-body foldably mounted on the main body, a sensor means for detecting a fully open status or a fully closed status of the sub-body with respect to the main-body, and a sub-body opening and closing drive unit for automatically opening or closing the sub-body by activating a sub-body drive motor, under control of a control unit. The method includes the steps of taking a measurement of an amount of motor driving current applied to the sub-body drive motor when there is an activation of the sub-body opening and closing drive unit to drive the sub-body drive motor for opening or closing the sub-body in compliance with a user's selection to automatic opening or closing by a switch, and of discontinuing to drive the sub-body drive motor when the measured amount of motor driving current is larger than a predetermined current threshold value and the sensor means detects either a fully open status or a fully closed status of the sub-body.

Preferably, the measurement of the motor driving current is carried out in a period of several tens of milliseconds.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1A:
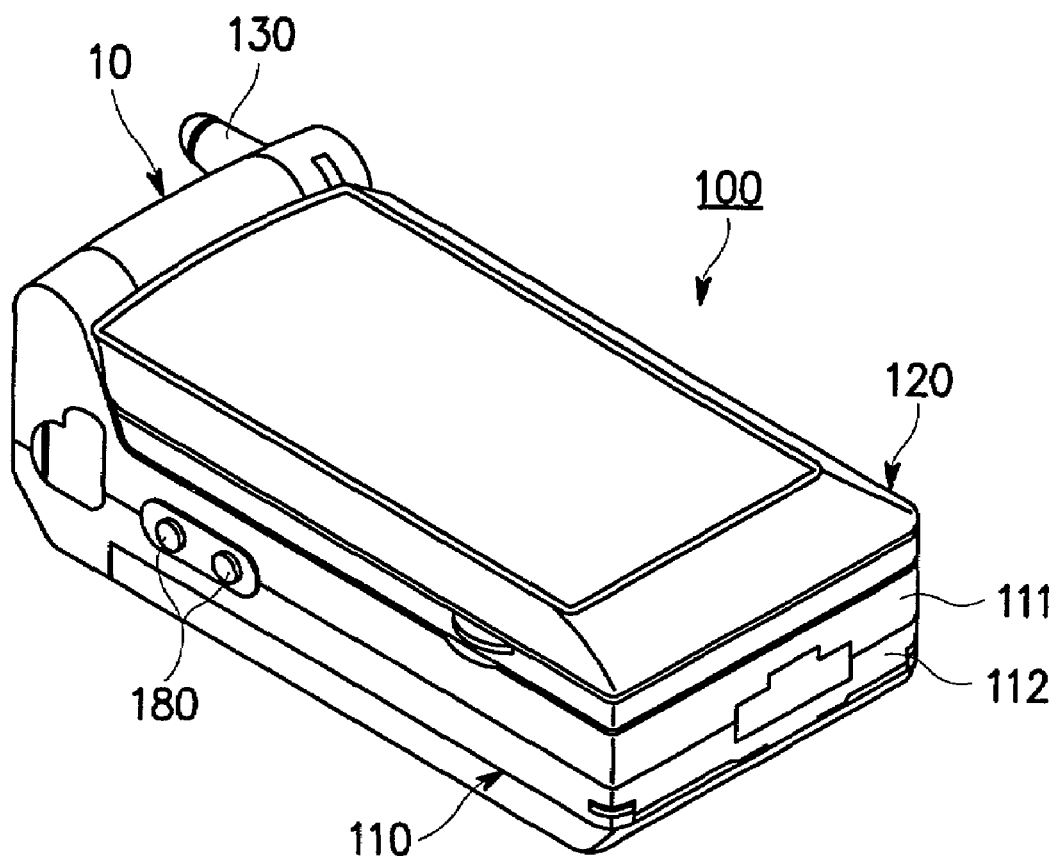
FIG. 1A is a perspective view illustrating a foldable mobile terminal according to a preferred embodiment of the present invention with its sub-body folded.

A preferred embodiment of the present invention will be described herein below with reference to the accompanying drawings. In the following description, well-known functions or constructions are not described in detail since they would obscure the invention in unnecessary detail. Like reference numerals are intended to represent like components.

Figure 1B:
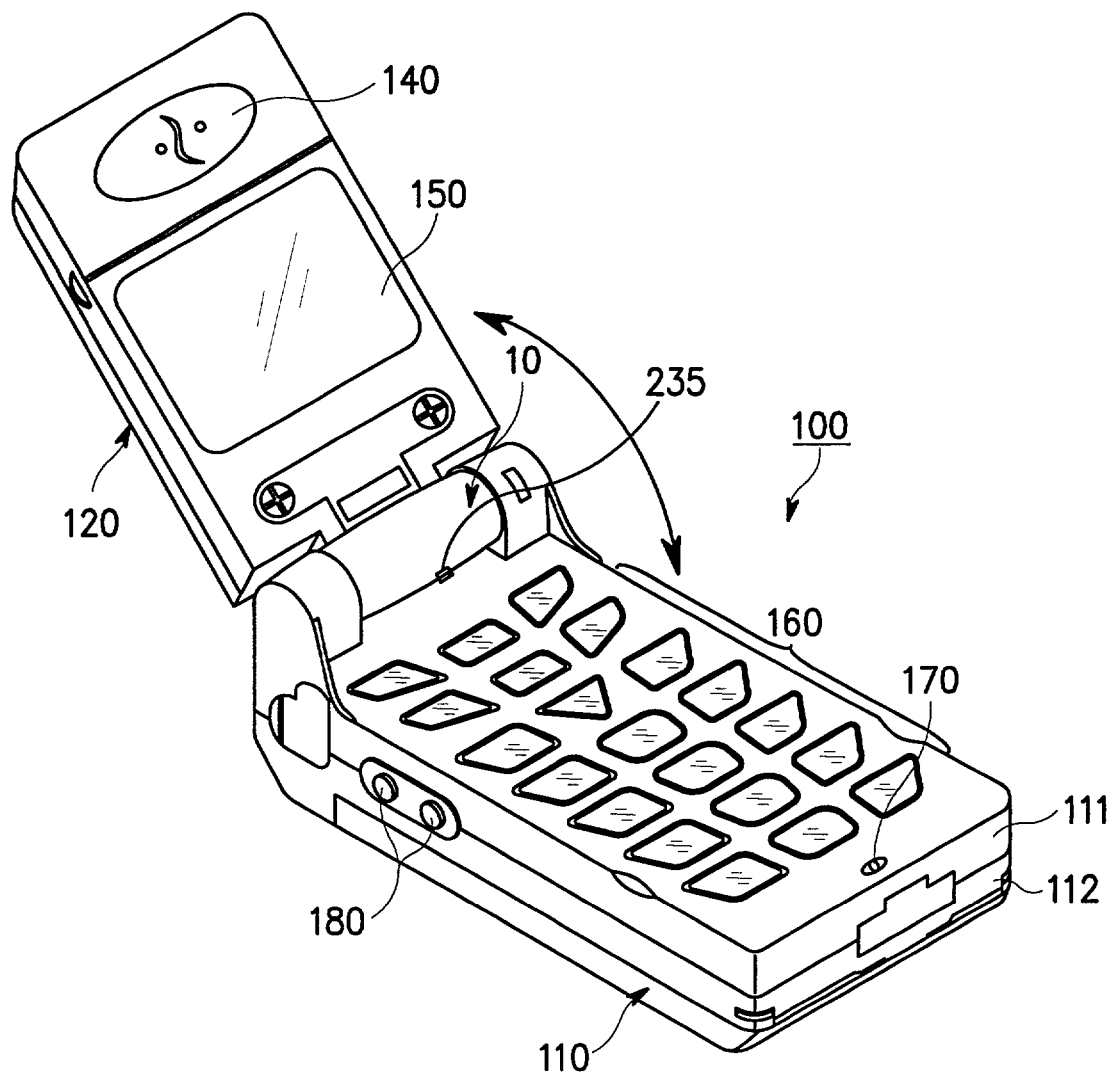
FIG. 1B is a perspective view illustrating the foldable mobile terminal according to a preferred embodiment of the present invention with the sub-body unfolded.

FIG. 1A shows a perspective view of a folder-type mobile terminal 100 with its sub-body folded onto a main-body, while FIG. 1B shows a like perspective view of the folder-type mobile terminal with the sub-body unfolded from the main-body. Referring now to FIGS. 1A and 1B, the folder-type (foldable) mobile terminal 100 includes a main body 110 having an upper casing frame 111 and a lower casing frame 112, and a sub-body 120 for protecting a keypad 160 mounted on the main body 110. An opening/closing drive unit 10 for opening or closing the sub-body 120 automatically or manually, as per a user's selection, is disposed in an upper side of the main-body 110. Further, the main body 110 is provided with an antenna device 130 mounted on a selected upper edge. The sub-body 120 coupled at its lower end to the main body 110 has an earpiece 140 preferably disposed on its upper part, and an LCD module 150 for a display internally disposed at the lower part of the earpiece 140. The main body 110 is provided with a keypad 160 and a microphone 170 mounted thereon. Further, an automatic folder opening/closing switch 180 for opening or closing the sub-body 120 is provided to a selected side end of the main-body 110. The opening/closing drive unit 10 drives to open or close the sub-body 120 on the main-body 110 as a user selects a desired folder operation, either automatic or manual, by means of the automatic folder opening/closing switch 180. An opening sensor and a closing sensor used for sensing full opening and full closing of the sub-body are respectively disposed in a location indicated by a reference numeral 235 or preferably in its vicinity on the opening/closing drive unit 10 of the main-body 110.

Figure 2:
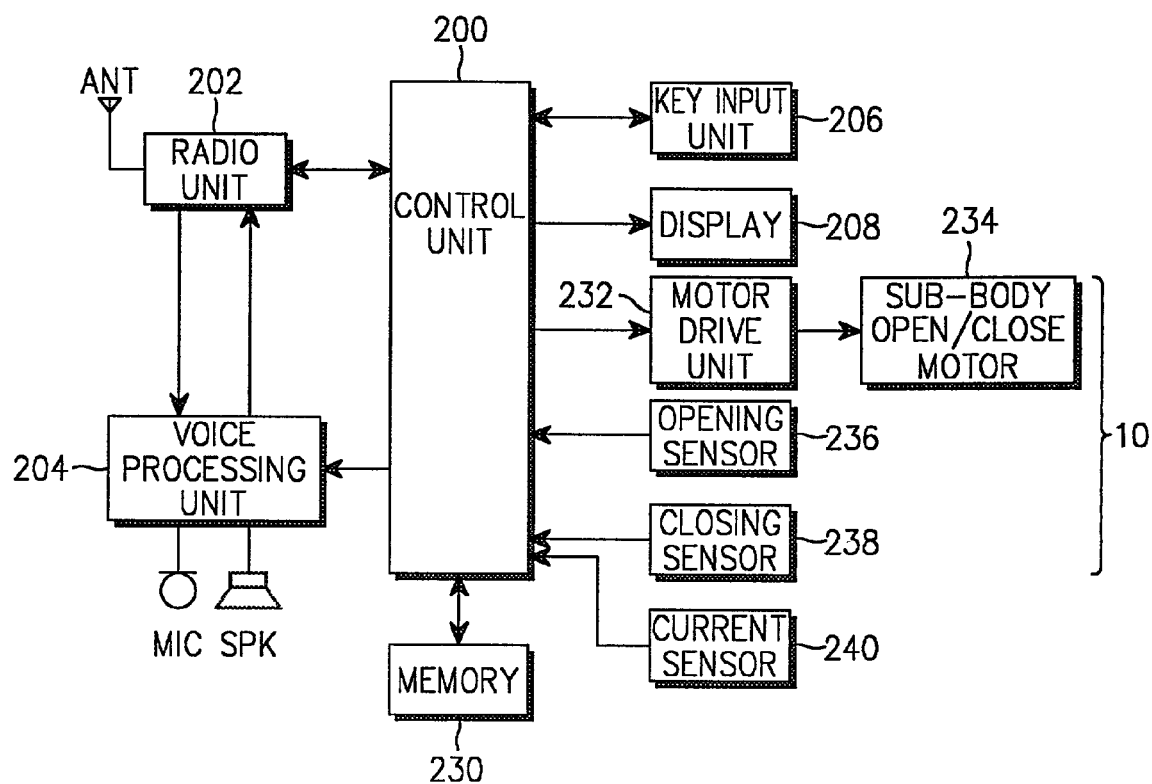
FIG. 2 is a schematic bock diagram illustrating electrical construction of the foldable mobile terminal according to a preferred embodiment of the present invention.

Referring now to FIG. 2, a schematic electrical diagram of the foldable mobile terminal 100 according to a preferred embodiment of the present invention is described in more detail. First, a control unit 200 serves to direct and perform overall control operations of the mobile terminal 100. A radio unit 202 coupled to the control unit 200 serves to control transmitting and reception of voice data, as well as various communication control data, through an antenna ANT under control of the control unit. A voice processing unit 204 serves to convert the voice data received from the radio unit 202 to audible sound through a speaker SPK, and it also serves to convert a voice signal received from a microphone MIC to radio data so that the converted radio data is provided to the radio unit 202 for transmission, under the control of the control unit 200. A key input unit 206 connected to the control unit 200 is designed with a set of numeral keys, character keys, and various function keys disposed on a keypad 160, as shown in FIGS. 1A and 1B. An automatic folder opening/closing switch 180 is arranged on a one side of the main-body 110. The key input unit 206 supplies to the control unit 200 a respective key data corresponding to a key depressed by a user of the mobile terminal 100. A display unit 208 serves to display thereon various messages for a user under control of the control unit 200. A memory unit 230 connected the control unit 200 is preferably designed to have a program memory for storing a set of system operating programs and control data provided by a manufacturer, required to control the entire functions and operations of the mobile terminal 100, and a data memory for storing various user data temporarily generated during a use of the mobile terminal 100 by a user or upon a system control. The opening/closing drive unit 10 of FIGS. 1 and 2 includes a motor drive unit 232, an opening sensor 236, a closing sensor 238, a sub-body open/close motor 234 and a current sensor 240.

Figure 3:
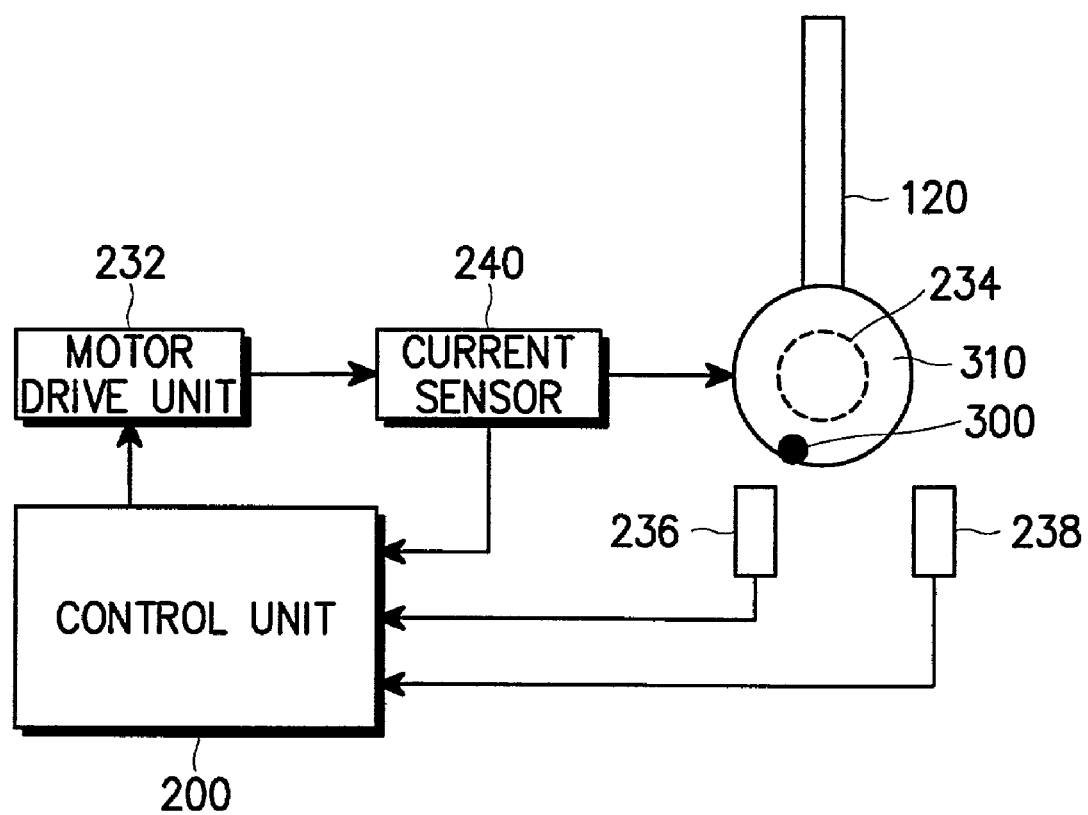
FIG. 3 is a more detailed schematic bock diagram of a sub-body opening and closing control assembly (drive unit) of the foldable mobile terminal according to a preferred embodiment of the present invention.
Figure 4:
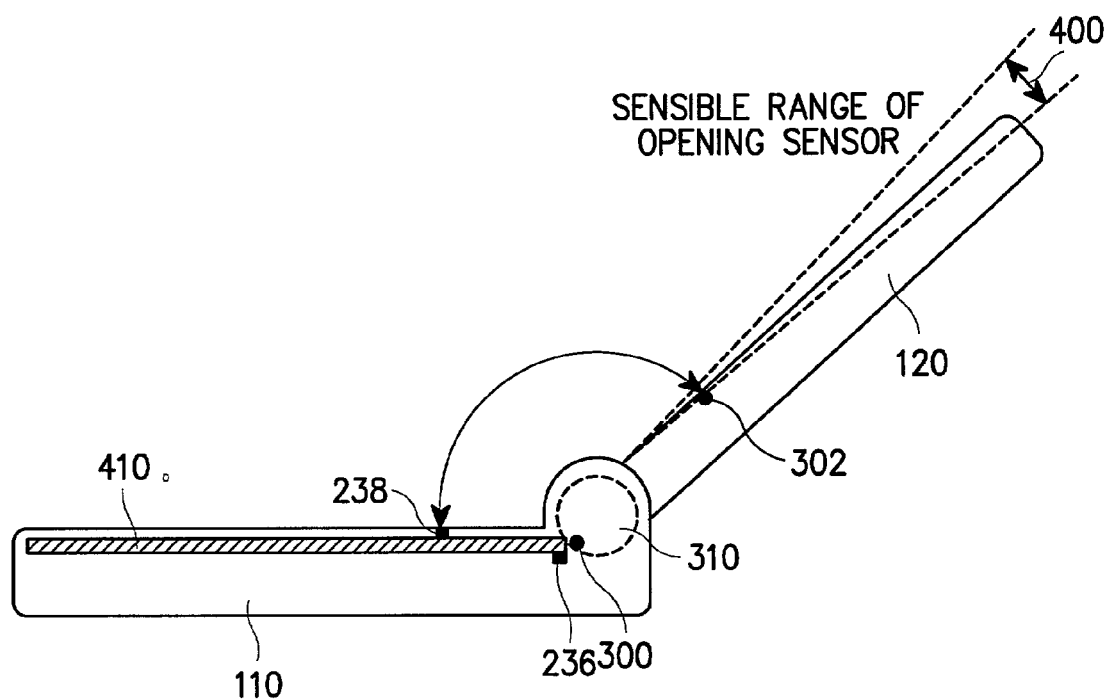
FIG. 4 is a perspective view illustrating a sensible range of an opening sensor upon opening of a sub-body in the foldable mobile terminal according to a preferred embodiment of the present invention.

Referring to FIG. 3, a more detailed schematic bock diagram of a sub-body opening and closing drive unit of the foldable mobile terminal according to a preferred embodiment of the present invention is explained. Further, FIG. 4 illustrates a sensible range 400 of the opening sensor 236 upon opening of the sub-body 120 in the foldable mobile terminal 100, and the arrangement of the opening sensor 236 and the closing sensor 238 according to a preferred embodiment of the present invention. The motor drive unit 232 receives electric power from a battery of the mobile terminal and serves to drive the sub-body open/close motor 234 positioned inside a hinge 310 coupled with one end of the sub-body 120 in a clockwise or counterclockwise direction under the control of the control unit 200. A magnet 300 for the opening sensor 236 is mounted onto a peripheral end of the hinge 310 of the sub-body opening/closing drive unit 10, and the opening sensor 236 is arranged beneath one side of a printed circuit board 410 adjacent to the hinge 310, the printed circuit board being inserted inside the main-body 110. Another magnet 302 for the closing sensor 238 is mounted on an inner surface of an upper plate of the sub-body 120, so that the magnet 302 is placed in contact with the closing sensor 238 in a closed position of the sub-body 120, in which the closing sensor 238 is disposed on an upper side of the printed circuit board 410, spaced apart from the hinge 310. Accordingly, when the sub-body 120 is fully open, the opening sensor 236 is located in a closely adjacent position to the magnet 300 for the opening sensor 236, as shown in FIG. 4, thereby outputting an open sensing signal corresponding to a fully open status of the sub-body 120. However, when the sub-body 120 is fully closed onto the main-body 110, the closing sensor 238 is located in a closely adjacent position to the magnet 302 for the closing sensor 238, thereby outputting a closing sensing signal corresponding to a fully closed status of the sub-body 120, to the control unit 200. The opening sensor 236 and the closing sensor 238 are preferably of a kind of hall sensor. The sub-body opening and closing drive unit 10 is provided with a current sensor 240, which senses a motor drive current applied to the sub-body open/close motor 234 from the motor drive unit 232 and supplies the sensed current to the control unit 200.

Referring to FIG. 4, a sensible range 400 of the opening sensor 236 upon opening of the sub-body out of the main-body in the foldable mobile terminal is shown. Within this range, the opening sensor 236 can sense the magnet 300 correctly, but beyond this range the opening sensor 236 cannot sense the magnet 300 accurately. Existence of such a sensible range 400 is apt to mean that the control unit 200 cannot make an accurate control of fully open position of the sub-body 120. Although FIG. 4 illustrates the sensible range of the opening sensor 236 only upon opening of the sub-body 120, it should be noted that a sensible range of the closing sensor 238 also exists likewise.

Figure 5:
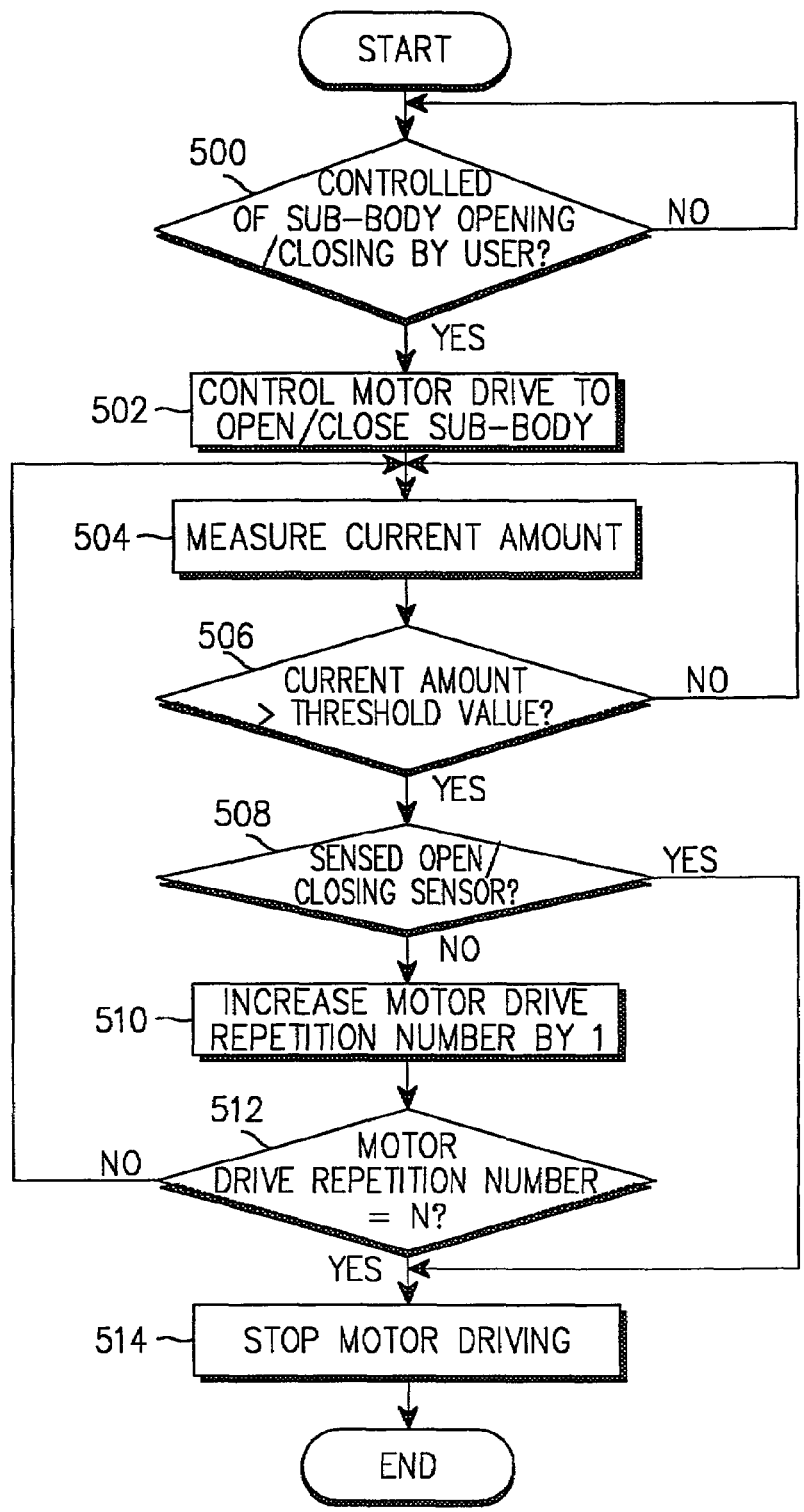
FIG. 5 is a flow chart illustrating a control procedure for automatically opening and closing a sub-body in the foldable mobile terminal according to a preferred embodiment of the present invention.

Referring now to FIG. 5, a flow chart of a control procedure for automatically opening and closing the sub-body 120 in the foldable mobile terminal 100 according to a preferred embodiment of the present invention is shown. The control unit 200 performs the control procedure to make a precise control of stopping position of opening and closing of the sub-body 120. Hereinafter, operation of the control procedure of the present invention will be described in more detail with reference to the aforementioned figures.

Assuming that a user of the foldable mobile terminal initially performs a manipulation of automatic opening/closing of a sub-body 120 by depressing an automatic folder opening/closing switch 180, the control unit 200 receives predetermined key data corresponding to the depressed switch 180, so that it is recognized as a control of automatic opening or closing of the sub-body 120 in step 500 as shown in FIG. 5. Then, in step 502, the control unit 200 performs a motor drive control for a given time so as to open or close the sub-body 120 from or onto the main-body 110. That is, the control unit 200 makes a control of the motor drive 232 to have the sub-body open/close motor 234 rotate either in a clockwise direction to open the sub-body or in a counter-clockwise direction to close the sub-body. In step 504, the control unit 200 periodically makes a measurement of an amount of motor driving current sensed by the current sensor 240 by a predetermined period, for instance, every 30 milliseconds (msec), and then the amount of motor driving current is converted into a corresponding value of current code by an analog-to-digital converter (not shown) internally installed within the control unit 200 so that the converted current value can be further processed.

Figure 6:
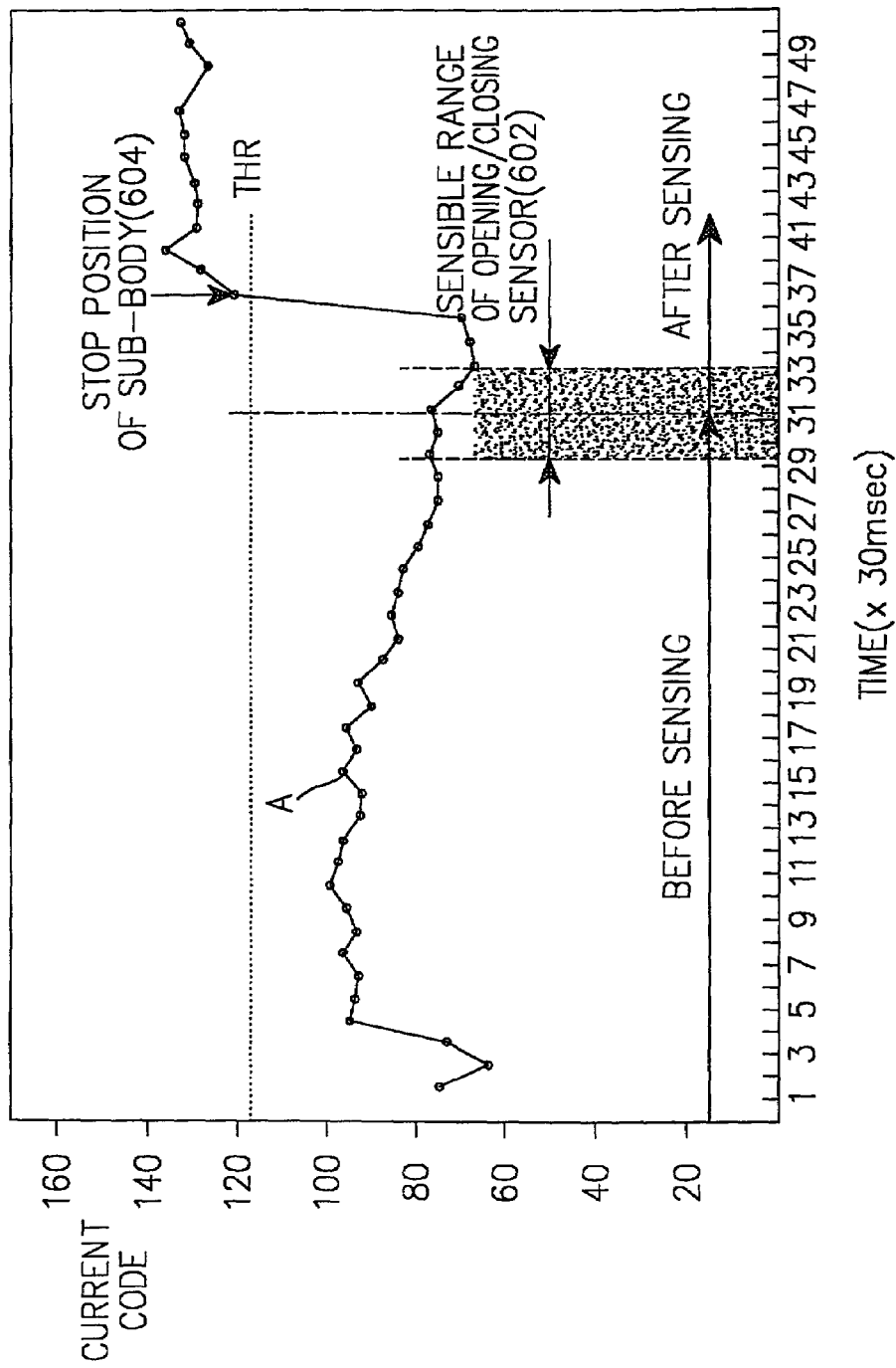
FIG. 6 is a graphic diagram illustrating stopping positions of a sub-body upon its opening/closing in the foldable mobile terminal according to a preferred embodiment of the present invention.

Referring now to FIG. 6, stopping positions of the sub-body 120 upon its opening/closing in the foldable mobile terminal according to a preferred embodiment of the present invention are graphically shown. In FIG. 6, a curved line A represents a profile of the current code values measured by the control unit 200 in every 30 msec period, a threshold value THR represents a given reference value used for anticipating a status of motor operation, and a reference numeral 602 represents a sensing range capable of detecting the magnet 300 by the opening sensor 236 and the closing sensor 238.

Meanwhile, in step 506, the control unit 200 makes a control to determine whether the measured current code value is more than a predetermined current threshold value THR, in which step the current code values more than this current threshold value THR will stand for an overloaded state of the sub-body open/close motor 234. Such an overload status on the motor 234 is probably caused by a physical obstruction preventing a smooth movement during opening or closing of the sub-body 120, a fully open situation of the sub-body 120, or a fully closed situation thereof. Hence, if the measured current code is larger than the predetermined current threshold value THR, then the control proceeds to step 508 to determine whether the opening sensor 236 or the closing sensor 238 have sensed the magnet 300. In the step 508, when the opening sensor 236 or the closing sensor 238 have sensed the magnet 300, that is to say, when the previous two decision steps 506 and 508 are answered "YES", then the control of the control unit 200 proceeds to step 514 to stop driving the sub-body open/close motor 234 immediately.

A position 604 as seen in FIG. 6 represents the very position of meeting all the decision conditions (for instance, answered "YES") on the above two steps 506 and 508. It should be noted that this position 604 will not be formed in a certain range but at one point of location, as illustrated in FIG. 6. This leads to a conclusion that an opening or closing position of the sub-body 120 can be controlled properly and precisely.

In step 508, when the opening sensor 236 or the closing sensor 238 have not sensed the magnet 300, that is, answered "NO", then the control unit 200 proceeds to step 510 to increase a number of motor driving repetition by "1" from an initial value "0" for driving the sub-body open/close motor 234 further. This situation usually occurs when a smooth movement of the sub-body is physically interfered with by any outside obstruction during its opening or closing. Preferably, a counter to count the number of motor driving repetitions is provided to the control unit 200 or in association with the control unit 200 internally or externally. Then, the control unit 200 determines in step 512 whether or not the number of motor driving repetitions counted reaches a predetermined natural number "N", so that if the counted number has not still reached the number "N", then the control proceeds to the previous step 504 to repeat the aforementioned similar operations. However, if the counted number has reached the number "N", then the control proceeds to the step 514 to discontinue to drive the sub-body open/close motor 234 immediately.

As understood from the foregoing description, the present invention will not only achieve a very effective opening and/or closing operation of the sub-body in the foldable mobile communication terminal, but also a fully opening or closing position of the sub-body could be controlled in more safe and accurate manner.

While the present invention has been shown and described with reference to preferred embodiments thereof, it will be understood by those skilled in the art that various changes and modifications in form and detail may be made therein and equivalents may be substituted for elements thereof, without departing from the spirit and scope of the invention as defined by the appended claims.

What is claimed is:

1. An apparatus for controlling opening and closing of a folder in a foldable mobile communication terminal having a main body and a sub-body foldably mounted on the main body, said sub-body being opened or closed either automatically or manually in compliance with a user's selection, said apparatus comprising:
  a sensor means arranged at one end of the main-body and the sub-body, for detecting a fully open status or a fully closed status of the sub-body on the main-body;
  a sub-body opening and closing drive unit for automatically opening or closing the sub-body by means of activating a sub-body drive motor rotatably coupled with said one end of the sub-body, under control of a control unit;
  a current sensing unit coupled to the control unit for sensing an amount of motor drive current applied to the sub-body drive motor and providing the sensed amount of motor drive current to the control unit; and
  said control unit for taking a measurement of the amount of the motor drive current output from said current sensing unit upon enabling of an automatic opening or closing operation of the sub-body in the sub-body opening and closing drive unit in compliance with the user's selection of automatic sub-body control, and for discontinuing to drive the sub-body drive motor when the measured amount of the motor drive current is larger than a predetermined current threshold value and the sensor means senses one of a fully open status and a fully closed status of the sub-body and discontinuing to drive the sub-body drive motor after driving the sub-body drive motor for at least more than one cycle of the motor when the measured amount of the motor drive current is larger than the predetermined current threshold value and the sensor means senses neither one of a fully open status and a fully closed status of the sub-body.

2. The apparatus as claimed in claim 1, wherein said sensor means further comprises:
  a first magnet disposed in a hinge rotatably connected to one end of the sub-body and the main-body, said hinge being provided with the sub-body opening and closing drive unit;
  a second magnet mounted inwardly on an inner surface of the sub-body, spaced apart from the hinge;
  an opening sensor disposed, in the vicinity of the hinge, on one end of a lower surface of a printed circuit board inside the main-body, for providing the control unit with a first sensing signal indicating a fully open status of the sub-body from the main-body, when the first magnet is placed in close proximity to the opening sensor; and
  a closing sensor disposed in a position opposing to the second magnet, spaced apart from the hinge, on the printed circuit board inside the main-body, for providing the control unit with a second sensing signal indicating a fully closed status of the sub-body onto the main-body, when the second magnet is placed in close proximity to the closing sensor.

3. A method for controlling automatic opening and closing of a folder in a foldable mobile communication terminal having a main body, a sub-body foldably mounted on the main body, a sensor means for detecting a fully open status or a fully closed status of the sub-body with respect to the main-body, and a sub-body opening and closing drive unit for automatically opening or closing the sub-body by activating a sub-body drive motor, under control of a control unit, the method comprising the steps of;
  taking a measurement of an amount of motor driving current applied to the sub-body drive motor when there is an activation of the sub-body opening and closing drive unit to drive the sub-body drive motor for opening or closing the sub-body in compliance with a user's selection to automatic opening or closing by a switch;
  discontinuing to drive the sub-body drive motor when the measured amount of motor driving current is greater than a predetermined current threshold value and the sensor means detects one of a fully open status and a fully closed status of the sub-body; and
  discontinuing to drive the sub-body drive motor after driving the sub-body drive motor for at least more than one cycle of the motor when the measured amount of the motor drive current is greater than the predetermined current threshold value and the sensor means senses neither one of a fully open status and a fully closed status of the sub-body.

4. The method as claimed in claim 3, wherein the measurement of the amount of motor driving current is carried out in a period of several tens of milliseconds.

* * * * *